United States Patent [19]

Ballast

[11] Patent Number: 4,916,798

[45] Date of Patent: Apr. 17, 1990

[54] METHOD OF APPLYING APPLIQUE OR LIKE OBJECT TO A BASEPLATE

[75] Inventor: Rodney G. Ballast, Wyoming, Mich.

[73] Assignee: Jack Toering, Wyoming, Mich.

[21] Appl. No.: 391,739

[22] Filed: Aug. 8, 1989

Related U.S. Application Data

[63] Continuation of Ser. No. 237,519, Aug. 26, 1988, abandoned.

[51] Int. Cl.[4] .......... B23P 11/00

[52] U.S. Cl. .......... 29/432; 29/177; 29/798; 264/249; 428/139

[58] Field of Search .......... 29/432, 798, 177; 428/139; 264/249

[56] References Cited

U.S. PATENT DOCUMENTS

| | | | |
|---|---|---|---|
| 3,015,884 | 1/1962 | Chamberlain | 29/432 X |
| 3,130,489 | 4/1964 | Schlage | 29/432 |
| 3,180,009 | 4/1965 | Lenz | 29/432 X |
| 3,202,851 | 8/1965 | Zimmerle et al. | 310/259 |
| 3,266,452 | 8/1966 | Taylor | 29/432 |
| 3,729,804 | 5/1973 | Middleton | 29/432 |
| 3,768,144 | 10/1973 | Heinss | 29/432 |
| 3,791,016 | 2/1974 | Eberhardt et al. | 29/432 |
| 3,798,730 | 3/1974 | Morf | 29/177 |
| 4,306,511 | 12/1981 | Ashby et al. | |

OTHER PUBLICATIONS

"Comparison of Clearances and How They Affect Punch Hole Characteristics," Pivot Punch Corp. Catalog 1000, p. 49 (1/1986) (Entire Catalog submitted).

*Primary Examiner*—Charlie T. Moon

*Attorney, Agent, or Firm*—Price, Heneveld, Cooper, DeWitt & Litton

[57] ABSTRACT

Applique or similar object is simultaneously formed and affixed to a baseplate by juxtaposing a plate of contributing material adjacent the baseplate and forcing a punch entirely through the contributing material to shear the object from the plate of contributing material. The object, in turn, shears a slug from the baseplate, which is positioned against a die opening, forming an opening in the baseplate in which the object is retained by interference fit. The method may be used to affix objects from a contributing material that is either harder than or softer than the baseplate material.

17 Claims, 3 Drawing Sheets

METHOD OF APPLYING APPLIQUE OR LIKE OBJECT TO A BASEPLATE

This is a continuation of copening application Ser. No. 07/237,519 filed on Aug. 26, 1988, now abandoned.

BACKGROUND OF THE INVENTION

This invention relates to a method for manufacturing a composite article and in particular to such method including forming an object such as applique and attaching such object to a baseplate.

Applying applique, such as clock time marks, to a baseplate, such as the time ring of a clock face, is difficult at best. One approach has been to stamp the applique from a material of desired finish and color and to apply the applique to a baseplate of desired finish and color. An adhesive is applied to the back surface of the applique pieces which are individually aligned in a jig and then brought into engagement with the baseplate. Minute burrs on the backside of the applique tend to interfere with adequate adhesion to the baseplate resulting in occasional failure of the adhesive.

One proposed alternate is to form the applique of a substantially harder material than the baseplate and including pins extending rearwardly from the applique. The applique is applied to the baseplate by positioning individual applique pieces in a jig or the like and pressing the baseplate against the back of the applique so as to force the pins through the baseplate which retains the pins by frictional engagement. The difficulty with this approach is that the choice of materials is limited and must be different for the applique and the baseplate. Additionally, the applique must be preformed and prearranged in the jig prior to application to the baseplate.

Accordingly, it is an object of the present invention to overcome the difficulties of the prior art.

SUMMARY OF THE INVENTION

An object, such as applique, is applied to a baseplate by juxtaposing a plate of contributing material adjacent the baseplate and positioning the juxtaposed plates between a punch and die configured to the shape of the desired object. The punch is forced entirely through the contributing material to shear the object from the plate of contributing material. The object in turn shears a slug from the baseplate forming an opening in the baseplate in which the object is retained by interference fit. The resulting composite article includes an opening in the baseplate having a configuration of the attached object and the object retained in the opening by an interference fit developed between the object and the surface of the opening.

The invention provides a surprisingly attractive appearance and an exceptionally tight retention force between the object and the baseplate. Further, materials having a wide range of hardness may be used for both the baseplate and the contributing plate thus allowing a large choice of materials as well as potential for use in many applications.

When the invention is used to apply applique, such as time marks, to a time ring, the use of jigs to position the individual figures is eliminated because the applique is formed and affixed to the baseplate in the same step.

These and other related objects, advantages and features of this invention will become apparent upon review of the following specification in conjunction with the drawings.

BRIEF DESCRIPTION OF THE PREFERRED EMBODIMENT

Referring now specifically to the drawings, and the illustrative embodiments depicted therein, a composite article 10 is illustrated as a portion of a time ring of a clock face including a baseplate 12 and an object 14 attached to the baseplate. In the illustrative embodiment the attached object is a time mark, such as the numeral "2" portion of the number "12", on the time ring. Such an object affixed to a baseplate is referred to as applique.

Figure 1:
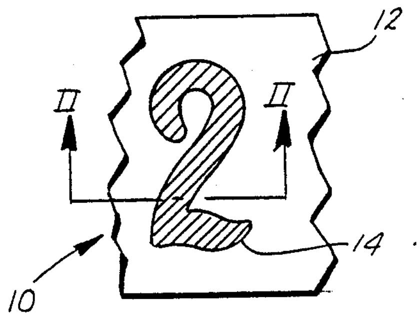
FIG. 1 is a partial front view of an article decorated according to the invention.
Figure 2:
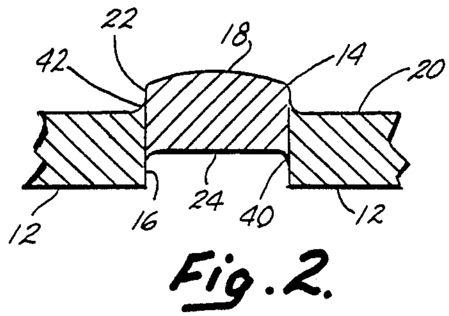
FIG. 2 is an enlarged sectional view taken along the lines II—II in FIG. 1.
Figure 3:
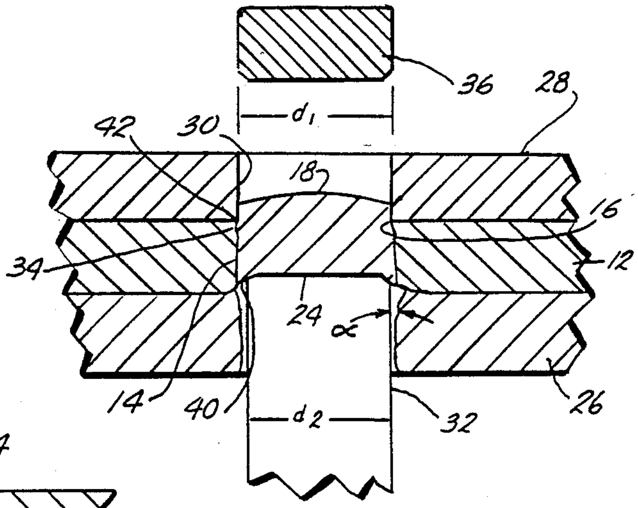
FIG. 3 is an illustration of the method according to the invention.

As illustrated in FIG. 2, object 14 is positioned within an opening 16 in baseplate 12. Opening 16 extends entirely through the thickness of the baseplate and has substantially the same configuration as the object. The illustrated object includes an outer surface 18 projecting beyond the outer surface 20 of baseplate 12. Object 14 further includes perimeter surface 22 which firmly engages the surface of baseplate 12 that defines opening 16 by an interference fit, in a manner that will be explained below. Object 14 further includes an inner surface 24.

In order to form object 14 and opening 16 in baseplate 12 and to firmly position the object within opening 16, a sheet of contributing material 26 is juxtaposed with baseplate 12. The juxtaposed plates are then positioned on a die 28 with the baseplate facing the die. Die 28 includes a pierce opening 30 configured substantially to the shape of the desired object. A punch 32, also of substantially the same configuration as the desired object 14, is forced by a press or the like into and through the plate 26 shearing a slug 34 from the plate. Slug 34 progresses into baseplate 12 acting as a punch to shear a scrap slug 36 from baseplate 12. The movement of punch 32 is terminated after a stroke predetermined to position slug 34 in a desired relationship to baseplate 12. Slug 36 and the remains of plate 26 are discarded as scrap or recycled.

Slug 34 forms an interference fit with baseplate 12 because it has a diameter greater than that of the opening 16 formed in baseplate 12 by the slug. The reason for this phenomenon is that slug 34 breaks out of material 26 with a positive breakout angle $\alpha$ causing it to have a diameter larger than the diameter $d_2$ of punch 32. Although slug 34 punches opening 16 in baseplate 12, the diameter of opening 16 is more closely related to diameter $d_1$ of pierce opening 30. Thus, taking the example where $d_1$ is equal to $d_2$, the positive breakout angle $\alpha$ will cause slug 34 to be larger than $d_2$ while opening 16 is very close in diameter to $d_1$. Thus, the diameter of slug 34 will be larger than opening 16 with the result that slug 34 will be retained in opening 16 with an interference fit.

As punch 32 presses on inner surface 24 of slug 34, deformation of this surface occurs. The only direction for the deformed metal to flow is outwardly. This creates a barb 40 extending radially outwardly from surface 24. This barb embeds into the surface of opening 16 and prevents object 14 from being forced out of opening 16. If diameter $d_1$ of pierce opening 30 is preselected to be either substantially the same as diameter $d_2$ of punch 32, or less than the diameter $d_2$ of punch 32 (negative die clearance), a second radially extending burr 42 is formed around the perimeter of outer surface 18. Burr 42 is formed by the action of slug 34 being forced within pierce opening 30, which is smaller than the diameter of the slug. Burr 42 engages outer surface 20 of baseplate 12 and restrains object 14 from being ejected rearwardly out of opening 16. Thus, it is seen that appropriate selection of the diameters of punch 32 and die 28 allows control of the interface between the applique and the baseplate to adjust the retaining force. If the diameter $d_1$ of pierce opening 30 is preselected to be much smaller than diameter $d_2$ of punch 32, the outer surface 20 of baseplate 12 will tend to become somewhat deformed adjacent the applique. In many applications, the enhanced retention strength is not worth the deformation of the baseplate.

In one embodiment, baseplate 12 and contributing material 26 are both 0.050" thick aluminum and $d_1$ is greater than $d_2$ by approximately 0.0005" (positive die clearance). This provides a smooth and slightly rounded surface 18 with negligible deformation of surface 20. Object 14 is retained in opening 16 with such strength that it is not readily removable by hand. By adjusting the thickness of baseplate 12 and the stroke of punch 32, outer surface 18 of object 14 can be positioned either flush with, extending from or even recessed within baseplate 12. If recessed within, then an additional step of removal of scrap slug 36 may be required.

Figure 4:
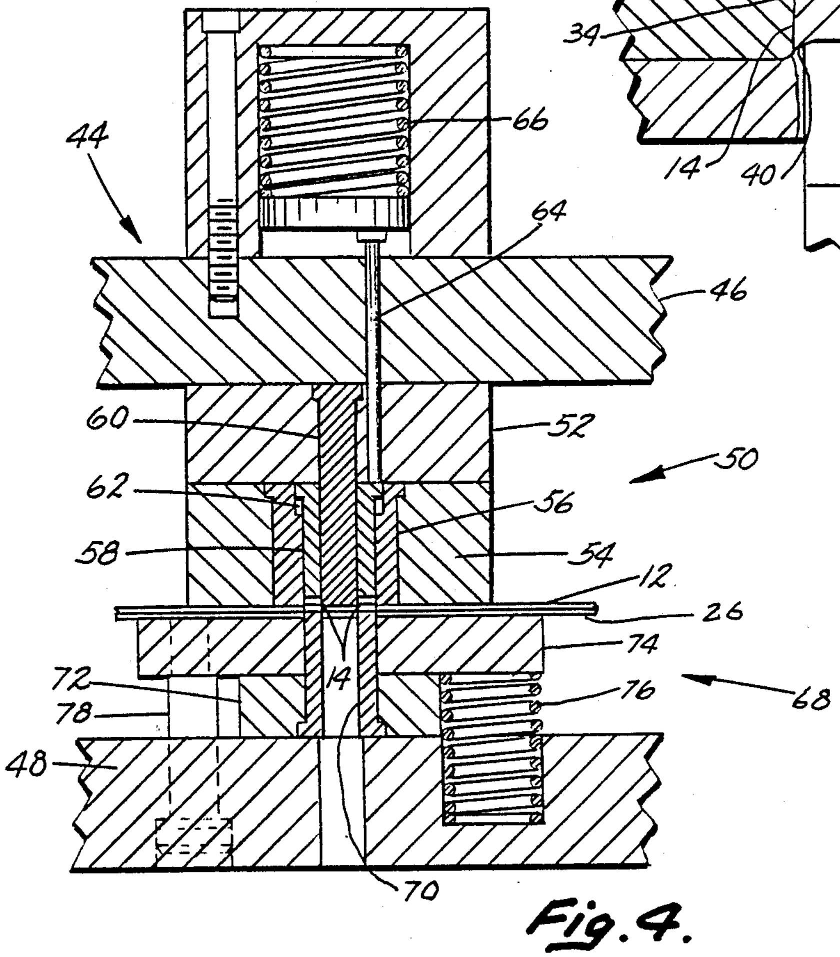
FIG. 4 is a sectional view of an apparatus for implementing the invention.

An embodiment of an apparatus for performing the process of the invention is illustrated in FIG. 4. Apparatus generally shown at 44 includes an upper shoe 46 and lower shoe 48 of a press, which are selectively forced together by a ram (not shown). An upper die assembly 50, associated with upper shoe 46, includes a retainer 52 attached to upper shoe 46 and a retainer 54 attached to retainer 52. A cylindrically-shaped opening in retainer 54 accommodates an outer pierce bushing 56 and a stamp bushing 58 concentrically received within an opening in pierce bushing 56. A pierce punch 60 extends from upper shoe 46 through aligned cylindrical openings in retainer 52 and stamp bushing 58. Pierce bushing 56 and pierce punch 60 are mounted in a manner that no relative movement with respect to upper shoe 46 is provided. In contrast, a gap 62 is provided between an upper portion of stamp bushing 58 and pierce bushing 56 to allow a limited amount of longitudinal movement between these members. An ejector pin 64 extends through aligned openings in retainer 52 and upper shoe 46 and into engagement with stamp bushing 58. Ejector pin 64 is biased downwardly by an ejector spring 66 to place a downward spring bias on stamp bushing 58.

A lower die assembly 68 includes a pierce bushing 70 rigidly held to lower shoe 48 by a retainer 72. A spring pad 74 surrounds pierce bushing 70 and axially reciprocates with respect to bushing 70. Spring pad 74 is biased away from lower shoe 48 by a die spring 76 and is non-rotatably retained in alignment with lower shoe 48 by a spool 78.

Figure 5A:
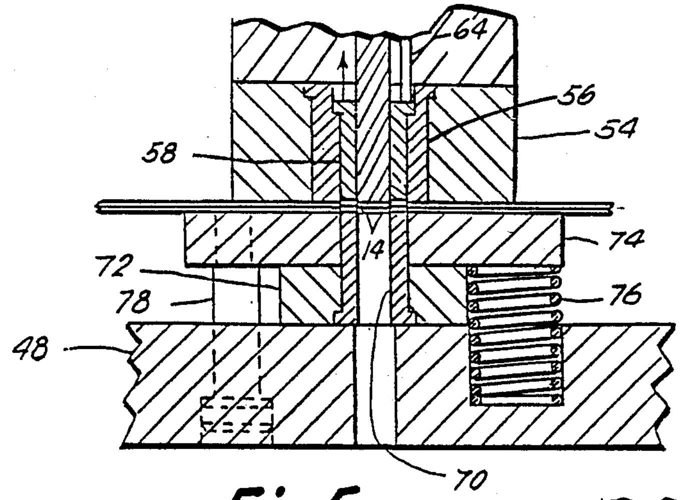
FIGS. 5*a* and 5*b* are an illustration of an embodiment of the invention including a coining step.
Figure 5B:
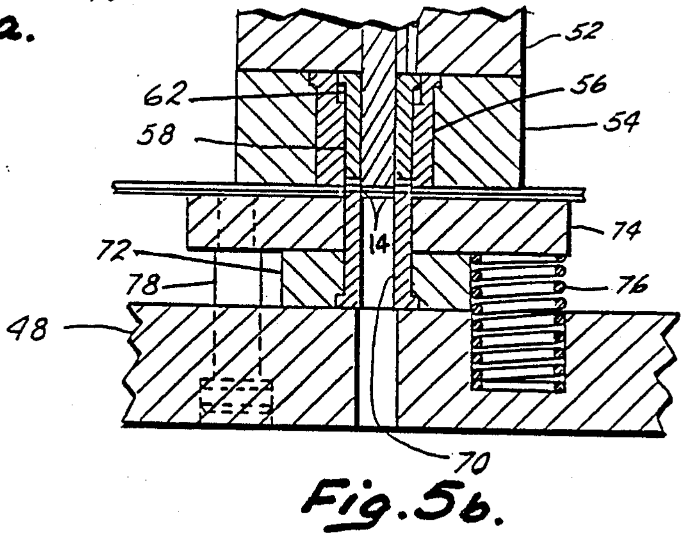

The apparatus 44 is illustrated in FIG. 4, forming a complex article having an affixed object that includes an uninterrupted perimeter of such contributing material retained by the baseplate and a portion of the baseplate retained within the contributing material. An example of an affixed object is the numeral "0". Apparatus 44 is illustrated in FIG. 4 in the end of its travel, forming article 10 including object 14 from baseplate 12 and contributing material 26. Pierce bushing 70 functions as the punch extending through contributing material 26 and partially through baseplate 12. Bushing 70 is received in a die opening defined between pierce bushing 56 and pierce punch 60. Stamp bushing 58 optionally serves as a coining member, stamping newly-formed surface 18 of object 14 to remove any bowing of the surface that may result from the forming process. Stamp bushing 58 additionally serves the function of properly spacing pierce punch 60 from pierce bushing 56. By reference to FIG. 5*a*, bushing 58 is free to move upwardly during the initial portion of the process but abuts retainer 52 at a terminal point of the process to perform the coining operation. Therefore, if the coining operation is not desired, then stamp bushing 58 would be shorter in length to provide clearance between its lower surface and the outer surface 18 of object 14.

As the upper and lower shoes are separated, ejector pin 64 forces stamp bushing 58 downwardly which ejects object 14 from the die opening between pierce punch 60 and pierce bushing 56 to separate the article 10 from upper die assembly 50. Likewise, die spring 76 forces spring pad 74 upwardly to separate pierce bushing 70 from baseplate 12. The baseplate 12 and contributing material 26 are then removed from apparatus 44 with the contributing material 26 and scrapped slug 36 discarded as scrap or recycled.

In the illustrated embodiment, the particular orientation of the upper and lower dies is preselected to allow the plate material to be fed into and removed from the die in a manner that any abrasion will occur on the contributing material 26, which is scrap, rather than on the front surface 20 of baseplate 12, which is the finished surface. Thus, contributing material 26 is oriented below baseplate 12 where it will receive the wear and tear from loading and unloading the die. Because the leftover contributing material 26 is scrap, it may be desirable to provide means (not shown) to index contributing material 26 with respect to baseplate 12 between applique operations in order to utilize more portions of material 26 and thus minimize scrap.

The present invention is capable of affixing objects to baseplates from a wide range of materials. Besides the application of an aluminum object to an aluminum base, the invention is capable of affixing an aluminum object to a steel base, a steel object to an aluminum base and a steel object to a steel base. Thus, it is seen that the invention is not limited to a particular hardness relationship between the baseplate material and the contributing material. This ability to use a much softer contributing material with a relatively harder baseplate material allows the application of objects made from polymeric plastics such as LEXAN™ plastic to an aluminum baseplate. This application is exceptionally useful for creating applique that is capable of backlighting. Thus, if the applique is of a translucent LEXAN plastic and is affixed to an aluminum baseplate, an illuminating source behind the baseplate will illuminate the applique, which is referred to as positive backlighting. Conversely, it has been discovered that aluminum contributing material may be utilized to affix applique to a polymeric plastic baseplate material such as translucent LEXAN plastic. In this application, the applique is opaque and the baseplate is translucent. The resulting complex article is suitable for negative backlighting by the positioning of a light source behind the baseplate to illuminate the baseplate but not the applique. Furthermore, the invention is suitable for affixing polymeric plastic object to a polymeric baseplate which promises a host of potential applications.

Figure 6A:
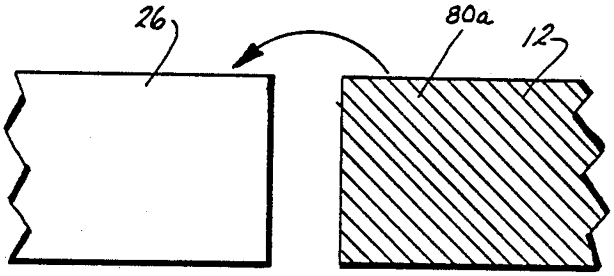
FIGS. 6*a* and 6*b* are an illustration of an embodiment of the invention including a transfer of a pattern from the baseplate to the object.
Figure 6B:
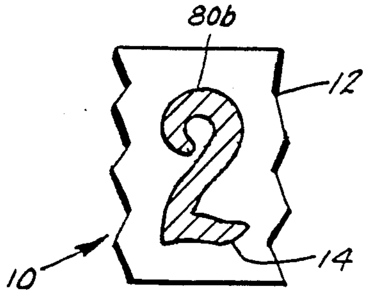

Furthermore, it has been discovered that the invention is adaptable to applying a particular pattern or finish, such as lines 80b (FIG. 6b) on the applique or object by supplying a baseplate material having the corresponding pattern or finish, such as lines 80a (FIG. 6a) formed in the surface that is engaged with the contributing material plate during the process. The process creates a large surface engagement force between the engaging surfaces of the baseplate and contributing material sufficient to transfer the pattern to the outer surface of the applique.

The invention has application beyond the decorating of articles such as clock faces. For example, an object such as an isolated electrical contact may be attached to a baseplate by utilizing the apparatus illustrated in FIG. 4 with a metal baseplate, such as copper, and an electrically insulating contributing material, such as LEXAN plastic. The centermost portion of the object will be a circular portion of the metal baseplate material retained within an "O" or doughnut object of insulating material which is, in turn, affixed to the baseplate. In this manner, the portion retained by the insulating material is firmly retained mechanically to the baseplate but electrically isolated therefrom.

One skilled in the art could preselect the thickness of the baseplate and contributing material and the throw of the die pieces in order to provide an inset, a flush or a raised applique or object with respect to the baseplate. The process will accommodate vastly different finishes, colors and material thickness and compositions. Other changes and modifications in the specifically described embodiments can be carried out without departing from the principles of the invention which is intended to be limited only by the scope of the appended claims, as interpreted according to the principles of patent law including the doctrine of equivalents.

I claim:

1. A method producing a composite article by simultaneously forming an object and permanently retaining said object to a baseplate comprising the steps of:

providing a baseplate and a plate of contributing material, each of said baseplate and said plate contributing material being responsive to a shearing force by fracturing at a substantial angle with respect to the direction of said force;

juxtaposing said plate of contributing material adjacent said baseplate;

positioning said plates between a punch and die configured to the approximate shape of said object;

forcing said punch into said contributing material to shear said object with a positive breakout angle from said plate of contributing material; and applying sufficient force to said punch to cause said object to shear a slug from said baseplate, thereby forming an opening in said baseplate and pressing said object into said baseplate opening, said slug having a size substantially determined by the shape of said die, said die having a size predetermined to cause said slug to be smaller than said object such that said object is retained in said baseplate opening by interference fit.

2. The method of claim 1 wherein positive die clearance is provided between said punch and die.

3. The method in claim 2 wherein said positive die clearance is approximately 0.0005".

4. The method in claim 1 wherein negative die clearance is provided between said punch and said die thereby forming a barb on said object outwardly of said baseplate.

5. The method in claim 1 further including providing a pattern on the surface of said baseplate facing said plate of contributing material whereby said pattern will be impressed on the surface of said object observable from a direction opposite from said baseplate surface.

6. The method in claim 1 wherein said step of providing includes providing a baseplate and a plate of contributing material that are both of the same material.

7. The method in claim 1 wherein said step of providing includes providing a plate of contributing material that is of a polymeric material.

8. The method in claim 7 wherein said contributing material is translucent, whereby said object is capable of positive backlighting.

9. The method in claim 1 wherein said step of providing includes providing a baseplate that is of a polymeric material.

10. The method in claim 9 wherein said baseplate is a translucent, whereby said object is capable of negative backlighting.

11. The method in claim 1 wherein said step of providing includes providing plates that are both of a polymeric material.

12. The method in claim 1 wherein said step of providing includes providing said baseplate of a material that is harder than said contributing material.

13. The method in claim 1 wherein said step of providing includes providing said baseplate of a material that is softer than said contributing material.

14. The method of claim 1 further including coining the outer surface of said object.

15. The method in claim 1 wherein said die is above said punch and said step of positioning includes positioning said plates with said baseplate being above said plate of contributing material so that the face of the resulting article from which the object is observed does not get marred when removing the article from the press.

16. The method in claim 1 in which said step of forcing includes forcing said punch sufficiently far into said baseplate and said plate of contributing material such that said object will be extending outwardly of said baseplate.

17. The method in claim 1 wherein said step of providing includes selecting said baseplate and said plate of contributing material from a group of material including aluminum, steel and polymeric plastics.

* * * * *

UNITED STATES PATENT AND TRADEMARK OFFICE
CERTIFICATE OF CORRECTION

PATENT NO. : 4,916,798

DATED : April 17, 1990

INVENTOR(S) : Rodney G. Ballast

It is certified that error appears in the above-identified patent and that said Letters Patent is hereby corrected as shown below:

Column 5, claim 1, line 1:
After "method" insert --of--.

Signed and Sealed this

Eighth Day of October, 1991

*Attest:*

HARRY F. MANBECK, JR.

*Attesting Officer*

*Commissioner of Patents and Trademarks*